F. A. HEADSON.
RUBBER FABRIC.
APPLICATION FILED JUNE 25, 1909.

989,967.

Patented Apr. 18, 1911.

Witnesses.
A. Y. Andrews.
Anna Schmidthauser.

Inventor.
Frank A. Headson.
By Benedict, Morsell & Caldwell
Attorneys.

UNITED STATES PATENT OFFICE.

FRANK A. HEADSON, OF MILWAUKEE, WISCONSIN, ASSIGNOR TO H. W. JOHNS-MANVILLE COMPANY, OF MILWAUKEE, WISCONSIN, A CORPORATION OF NEW YORK.

RUBBER FABRIC.

989,967.  Specification of Letters Patent.  Patented Apr. 18, 1911.

Application filed June 25, 1909. Serial No. 504,206.

*To all whom it may concern:*

Be it known that I, FRANK A. HEADSON, residing in Milwaukee, in the county of Milwaukee and State of Wisconsin, have invented new and useful Improvements in Rubber Fabrics, of which the following is a description, reference being had to the accompanying drawings, which are a part of this specification.

This invention has for its object to provide a fabric of asbestos or the like fiber mesh impregnated with a rubber composition having the property of remaining soft and pliable indefinitely while subjected to ordinary conditions, but which is capable of assuming a metallic character under conditions of prolonged heating as when employed for packing the joints of steam pipes and the like.

Another object of the invention is to provide such a fabric having a greater strength than that possessed by the asbestos or other fiber of its strands, which object is accomplished by the embedding a wire core in the strands.

With the above and other objects in view the invention consists in the fabric herein claimed and all equivalents.

Figure 1:
Figure 2:
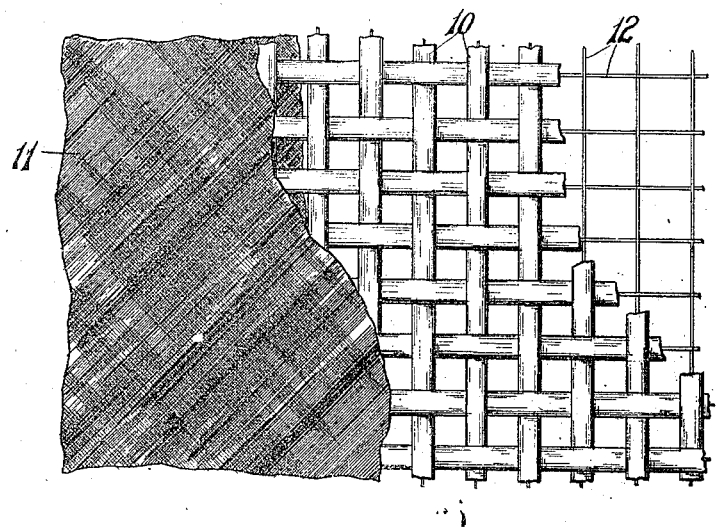
Figure 3:

Referring to the accompanying drawings in which like characters of reference indicate the same parts in the different views; Figure 1 is a sectional view of a fabric constructed in accordance with this invention; Fig. 2 is a detail view thereof showing a part with the rubber removed and a further part with the asbestos removed; and, Fig. 3 is a sectional view of a modified form of the fabric wherein the wire cores of the asbestos strands are omitted.

In these drawings 10 indicates the strands of asbestos fiber or the like of which the fabric is woven and 11 is a rubber composition comprising rubber, magnetic iron oxid and reduced metallic iron which is forced into the fabric under great pressure so as to entirely permeate the same, the fabric being then subjected to the action of calender rolls to give it a smooth finish. The fabric is of open mesh so that the rubber may pass entirely around the strands thereof and completely embed the asbestos therein. The asbestos fiber alone may be used to form the strands, as shown in Fig. 3, but to give greater strength to the fabric it is preferred to embed in each strand of asbestos fiber a fine brass wire core 12 which does not materially interfere with the pliability of the fabric.

The rubber composition above mentioned in approximately the proportions of rubber thirty-seven parts, magnetic iron oxid three parts and metallic iron (alcoholized iron) five parts has the property of remaining soft and pliable under usual conditions and the fabric of this invention comprising the woven strands of asbestos fiber impregnated with said composition has the property of remaining soft and flexible. Being of a mineral composition it is unaffected by heat or cold, while at the same time the wire and asbestos strand construction make it strong as well as pliable. Owing to its pliability the fabric when used as packing in pipe joints and the like will conform to any uneven surface and will set immediately and does not require " following up ", having the same expansion and contraction properties as iron, and therefore forms a joint that will be as firm as the pipe itself. The asbestos sheet being thoroughly impregnated with the rubber composition is entirely waterproof, for the composition will not allow the asbestos to soak up water, and as the composition is of metallic construction it is practically as free from being affected by steam, water, oil, acid or ammonia as the pipe line itself. When it forms the packing for a steam or other heated pipe the prolonged heating effect received by it serves to harden it into a metal-like structure entirely filling the cavity in which it is contained, for it does not contract upon hardening.

Because of its property of remaining soft and pliable under normal conditions the fabric of this invention is particularly suited for use as a lining for brake bands or belting and the like.

What I claim as my invention and desire to secure by Letters Patent is—

1. A fabric comprising intermeshed strands of asbestos or the like spaced apart and impregnated with a rubber composition containing metallic iron or other mineral to render it soft and pliable under normal conditions.

2. A fabric comprising intermeshed strands of asbestos or the like spaced apart and impregnated with a rubber composition containing reduced metallic iron and magnetic iron oxid to render it soft and pliable under normal conditions.

3. A fabric comprising intermeshed strands of asbestos or the like surrounding cores of brass wire, said fabric being open meshed and impregnated with a rubber composition containing reduced metallic iron and magnetic iron oxid to render it soft and pliable under normal conditions.

In testimony whereof, I affix my signature, in presence of two witnesses.

FRANK A. HEADSON.

Witnesses:
R. S. C. CALDWELL,
ANNA F. SCHMIDTBAUER.